United States Patent [19]

Uozumi

[11] Patent Number: 4,510,833
[45] Date of Patent: Apr. 16, 1985

[54] ONE-ROTATION CLUTCH
[75] Inventor: Osamu Uozumi, Zushi, Japan
[73] Assignee: Ricoh Company, Ltd., Tokyo, Japan
[21] Appl. No.: 566,468
[22] Filed: Dec. 28, 1983
[30] Foreign Application Priority Data
Dec. 29, 1982 [JP] Japan .................................. 57-229854
[51] Int. Cl.³ ............................................. B26D 5/08
[52] U.S. Cl. ...................................... 83/205; 83/283; 192/4 R; 192/12 BA; 192/17 R
[58] Field of Search .......................... 83/204, 205, 283; 192/4 R, 12 BA, 17 R; 188/82.3, 82.34

[56] References Cited
U.S. PATENT DOCUMENTS 3,539,041 11/1970 Sacchini ...................... 192/12 BA
3,779,114 12/1973 Rabin ................................ 83/205
4,154,128 5/1979 Kasuga et al. ................... 83/205
4,362,076 12/1982 Sasaki et al. ..................... 83/283

FOREIGN PATENT DOCUMENTS 2049863 8/1978 Fed. Rep. of Germany ........ 192/12 BA

Primary Examiner—Frank T. Yost
Assistant Examiner—Hien H. Phan
Attorney, Agent, or Firm—David G. Alexander

[57] ABSTRACT

A one-rotation clutch for selectively establishing and interrupting transmission of a drive force from a drive source to an object to be driven. A coil spring loosely surrounds the outer peripheries of mutually opposing sprocket member and a cam member. One end of the coil spring is retained by the cam member and the other end by a sleeve, which is rotatable relative to the sprocket member. A locking member is provided to selectively stop the rotation of the sleeve driven by a solenoid. When the sleeve is stopped, the sprocket member idles. When the sleeve is caused to follow the movement of the sprocket member, the coil spring binds the sprocket member and cam member to impart the drive force to the cam member. A pin is studded on the cam member such that when the cam member is rotated in a predetermined direction, the pin immediately abuts against the locking member to urge it away from the sleeve.

11 Claims, 4 Drawing Figures ially V-shaped so that both the sheets 10a and 18a are
ONE-ROTATION CLUTCH

BACKGROUND OF THE INVENTION

The present invention relates to a one-rotation clutch for selectively transmitting a drive force through a coil spring and interrupting the transmission and, more particularly, to one which is suitable for effecting intermittent motions such as sheet feeding and sheet cutting motions which are required for an electrophotographic copier or a facsimile apparatus.

One-rotation clutches are installed in electrophotographic copiers, facsimile apparatuses and various other apparatuses in order to transmit rotational drive forces from motors or like drive sources to sheet transport mechanisms, sheet cutting mechanisms and the like associated therewith. One-rotation clutch of the type described is interposed between a sprocket rotatable in a predetermined direction through a chain, which transmits a rotational drive force from a motor, and a drive shaft on which a driven member of a desired mechanism is rigidly mounted. In this construction, when the driven member or the drive shaft is rotated by hand in a predetermined direction, the manual effort also causes the drive source, or motor, into rotation by way of the sprocket and chain. Therefore, a substantial load exerted by the drive source has to be overcome when it is desired to manually rotate the driven member or the drive shaft, such as when a registration roller or a sheet feed roller should be rotated in a sheet feed direction to remove a jammed sheet, or when a rotary cutting edge of a cutter should be rotated to manually cut a sheet.

Some approaches may be contemplated to solve the problem discussed above as exemplified by uncoupling a clutch by means of a release lever, using an electromagnetic clutch in addition to one-rotation clutch in order to disconnect the drive source load therewith, and supplying an electrical uncoupling signal, which is applicable to a case wherein only an electromagnetic clutch is employed for effecting one rotation. However, none of these approaches can be implemented without an intricate construction which would deteriorate the reliability of the whole apparatus and increase the costs.

SUMMARY OF THE INVENTION

It is therefore an object of the present invention to provide a one-rotation clutch which facilitates manual rotation of a driven member with a simple construction and, thereby, eliminates the drawbacks inherent in the prior art implementations.

It is another object of the present invention to provide a generally improved one-rotation clutch.

A one-rotation clutch for selectively establishing and interrupting transmission of a drive force from a drive source to a driven object of the present invention comprises a driven shaft integral with the driven object, driven means rigidly mounted on the driven shaft and having a locking member, drive means located to face the driven means and movably coupled over the driven shaft to be rotatable in a predetermined direction, sleeve means rotatably disposed between the driven means and the drive means and having a locked member on an outer periphery thereof, spring means disposed in the sleeve means with one end thereof retained by the driven means and the other end thereof retained by the sleeve means, the spring means being wound in such a direction that when the sleeve means is rotated in the predetermined direction with the driven means held in a halt, a coil diameter of the spring is reduced to bind the driven member and the drive member, and locking means selectively engageable with the locked member of the sleeve means, whereby when the driven means is rotated in the predetermined direction while the locking means is in engagement with the locked member of the sleeve means, the locking member of the driven means abuts against the locking means to immediately release the locking means and the locked member from each other.

In accordance with the present invention, a one-rotation clutch for selectively establishing and interrupting transmission of a drive force from a drive source to an object to be driven. A coil spring loosely surrounds the outer peripheries of a mutually opposing sprocket member and cam member. One end of the coil spring is retained by the cam member and the other end by a sleeve, which is rotatable relative to the sprocket member. A locking member is provided to selectively stop the rotation of the sleeve driven by a solenoid. When the sleeve is stopped, the sprocket member idles. When the sleeve is caused to follow the movement of the sprocket member, the coil spring binds the sprocket member and cam member to impart the drive force to the cam member. A pin is studded on the cam member such that when the cam member is rotated in a predetermined direction, the pin immediately abuts against the locking member to urge it away from the sleeve.

The above and other objects, features and advantages of the present invention will become apparent from the following detailed description taken with the accompanying drawing.

DESCRIPTION OF THE PREFERRED EMBODIMENT

While the one-rotation clutch of the present invention is susceptible of numerous physical embodiments, depending upon the environment and requirements of use, a substantial number of the herein shown and described embodiment have been made, tested and used, and all have performed in an eminently satisfactory manner.

To facilitate understanding of the present invention, a brief reference will be made to a sheet transport mechanism of a facsimile apparatus which employs a prior art one-rotation clutch, illustrated in FIG. 1.

Figure 1:
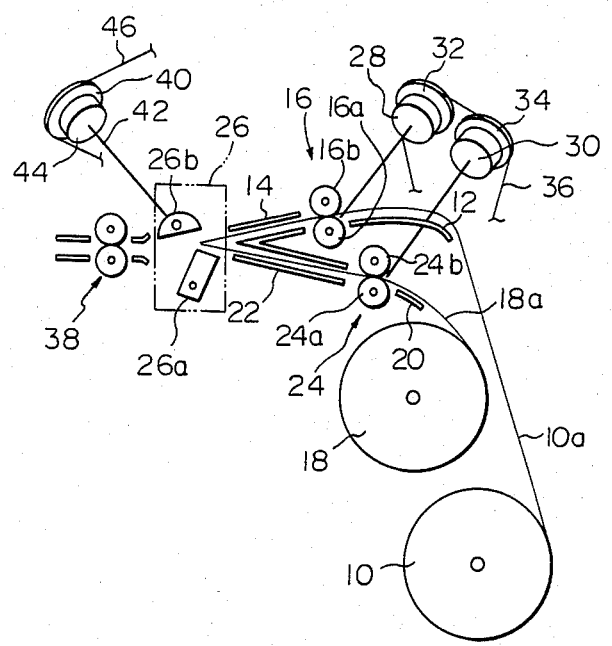
FIG. 1 is a schematic diagram of a sheet feed system of a facsimile apparatus which employs a prior art one-rotation clutch therein.

In FIG. 1, a pair of feed rollers 16 are disposed between guides 12 and 14 in order to transport a sheet 10a of a format A paid out from a sheet roll 10. Likewise, a pair of feed rollers 24 are located between guides 20 and 22 to transport a sheet 18a of a format B which is paid out from a sheet roll 18. The guides 14 and 22 are generally V-shaped so that both the sheets 10a and 18a are directed toward a cutter 26. The feed roller pair 16 comprises a drive roller 16a and a driven roller 16b and the feed roller pair 24, a drive roller 24a and a driven roller 24b. The drive rollers 16a and 24a are respectively connected to sprockets 32 and 34 by way of electromagnetic clutches 28 and 30, the sprockets 32 and 34 being commonly driven by a chain 36.

When a signal indicative of the sheet of the format A is entered, the electromagnetic clutch 28 is energized to transmit the rotation of the sprocket 32 to the drive roller 16a. Then, the sheet 10a is nipped and driven by the feed roller pair 16 to the cutter 26. A feed roller pair 38 is adapted to transport the sheet coming out from the cutter 26 to a discharge passageway. Upon the completion of printout, a stationary edge 26a and a rotary edge 26b of the cutter 26 cooperate to cut the sheet 10a after a predetermined period of time has expired. Thereafter, the clutch 28 is deenergized to interrupt the transmission of rotation from the sprocket 32 to the drive roller 16a and, thereby, the sheet feed from the roll 10. In the meantime, the cut length of sheet is discharged to a copy tray (not shown) which is positioned outside the machine.

The rotary edge 26b, after performing one full rotation in response to a cut command signal, remains in a halt until the entry of another cut command signal. That is, a spring-loaded one-rotation clutch 44 is customarily employed for selective torque transmission from a sprocket 40, which constantly rotates in a predetermined direction, to a shaft 42 on which the rotary edge 26b is rigidly mounted. In such a construction, when the rotary edge 26b or the shaft 42 carrying the edge 26b is manually rotated in a predetermined direction while the sprocket 40 is in a halt, a chain 46 and a motor (not shown) are also rotated via the sprocket 40. This has given rise to a problem that one has to exert a disproportionate effort for manually cutting a sheet, i.e., moving the leading end of the sheet past the cutter 26 and then manually rotating the edge 26b. The manual cut may be performed in the event of setting the sheet, for example.

Figure 2:
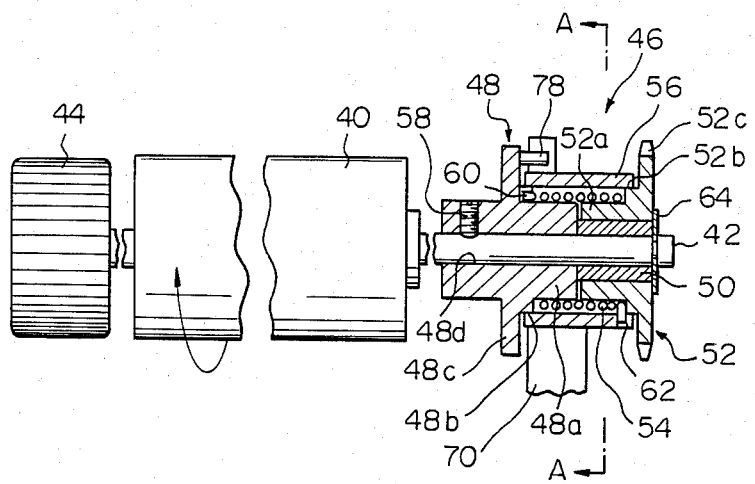
FIG. 2 is a partly taken away, partly sectional side elevation of a one-rotation clutch embodying the present invention.
Figure 3:
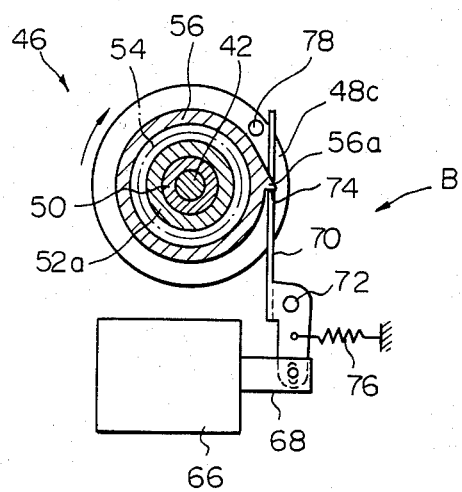
FIG. 3 is a section along line A—A of FIG. 2.
Figure 4:
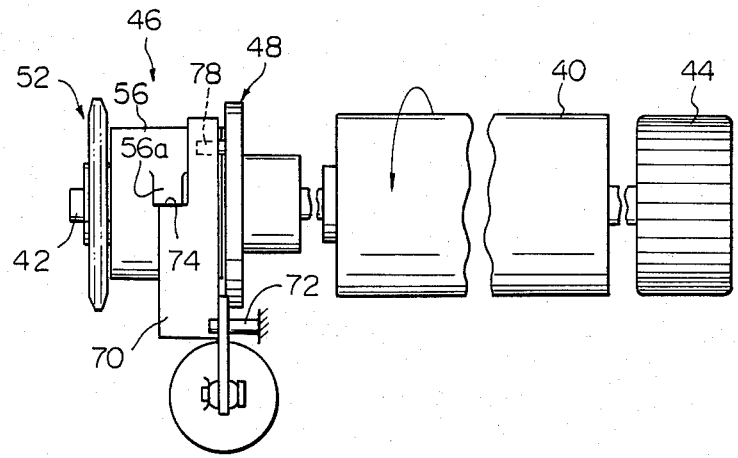
FIG. 4 is a partly taken away side elevation of the one-rotation clutch as viewed in a direction B shown in FIG. 3.

Referring to FIGS. 2-4, a one-rotation clutch embodying the present invention is shown. A rotary edge 40 is rigidly mounted on a driven shaft 42. The shaft 42 carries a knob 44 at one end thereof and a clutch assembly 46 at the other end. The clutch assembly 46 includes a cam 48, a bearing 50, a sprocket 52, a spring 54 and a sleeve 56. The cam 48 is made up of a cylindrical portion 48a, a stepped portion 48b, a flange portion 48c, and a boss 48d. A screw 58 is threaded into the boss 48d to fasten the clutch assembly 46 to the shaft 42. The bearing 50 is interposed between the shaft 42 and the sprocket 52 so that the sprocket 52 is rotatable, or slidable in the circumferential direction, relative to the shaft 42.

The sprocket 52 has a cylindrical portion 52a, a stepped portion 52b, and a toothed or gear portion 52c. The cylindrical portion 52a of the sprocket 52 and the aforementioned cylindrical portion 48a of the cam 48 are located to oppose each other and configured with a substantially same outside diameter. The stepped portion 52b is common in outside diameter to the stepped portion 48b of the cam. The sleeve 56 is disposed between the cam flange portion 48c and the sprocket gear portion 52c. The inner periphery of the sleeve 56 is rotatably engaged with the cam stepped portion 48b and the sprocket stepped portion 52b at axially opposite ends respectively. A lug 56a extends from the outer periphery of the sleeve 56 as illustrated in FIG. 3.

The spring 54 is accommodated in the annular space between the sleeve 56 and the cylindrical portions 48a and 52a and comprises a so-called right hand wind spring, which moved to the right in FIG. 2 when rotated as indicated by an arrow. The spring 54 is anchored at one end to a recess 60 formed in the cam stepped portion 48a and at the other end to a notch 62 formed in the rightmost end of the sleeve 56 as viewed in the drawing. In this construction, when the sleeve 56 is rotated as indicated by the arrow with the cam 48 held in a halt, the spring 54 will press the cylindrical portions 48a and 52a from outside reducing the coil diameter thereof. A snap ring 64 is fit on the end of the shaft 42 adjacent to the clutch assembly 46 in order to prevent the assembly 46 from slipping out of the shaft 42.

As shown in FIG. 3, a solenoid actuator 66 is located below the clutch assembly 46 and fixedly mounted on a stationary base plate. A plunger 68 extends out from the solenoid actuator 66 while one end of an armature 70 is loosely pivotted to the plunger 68. The armature 70 is formed by bending a thin steel sheet. The armature 70 is pivotted to a stationary shaft 72 substantially at the intermediate between opposite ends thereof and, at a position between the intermediate and the end remote from the plunger 68, formed with a shoulder 74 which is engageable with the lug 56a of the sleeve 56. A spring 76 is retained by a stationary base plate at one end and by a portion of the armature 70 adjacent to the plunger 68 at the other end, so that the armature 70 is constantly biased about the shaft 72 counterclockwise as viewed in FIG. 3 to maintain the shoulder 74 is pressing contact with the outer periphery of the sleeve 56.

As best shown in FIG. 3, a pin 78 is studded on that surface of the cam flange 48c which faces the sprocket 52. The pin 78 on the cam flange 48c is located just ahead of the free end of the armature 70 with respect to the direction of rotation indicated by the arrow in the drawing, in the illustrated interengaged condition of the sleeve lug 56a and the armature shoulder 74.

In operation, while the sprocket 52 rotates as indicated by the arrow through a chain (not shown) and no voltage is applied to the solenoid actuator 66, the sleeve 56 is kept unmoved by the armature 70 so that the sprocket 52 rotates about the shaft 42 via the bearing 50. This, coupled with the rotatable interengagement between the outer periphery of the stepped portion 52b and the inner periphery of the sleeve 56, prevents the torque developed by the sprocket 52 from being transmitted to the cam 48. So long as the cam 48 remains in a halt, so do the shaft 42 and the rotary cutting edge 40.

Assume that the solenoid actuator 66 is energized while the sprocket 52 is in rotation in the arrowed direction. Then, the plunger 68 moves the armature 70 clockwise as viewed in FIG. 3 against the action of the spring 76, thereby moving the armature shoulder 74 clear of the sleeve lug 56a. The sleeve 56, due to the frictional contact of its inner periphery with the sprocket stepped portion 52b, is caused to follow the movement of the sprocket 52 and, thereby, reduces the coil diameter of the spring 54, which is anchored at one end to the sleeve notch 62. The spring 54 presses or binds the sprocket cylindrical portion 52a and the cam cylindrical portion 48a from outside so as to substantially integrally connect the sprocket 52 to the cam 48. As a result, the torque of the sprocket 52 is imparted to the cam 48 and, via the shaft 42, to the cutting edge 40.

While the edge 40 cuts the roll sheet, the solenoid actuator 66 is deenergized to allow the armature 70 to remain in pressing contact with the outer periphery of the sleeve 56 at the free end thereof under the action of the spring 76. When the edge 40 has completed one full rotation, the armature shoulder 74 again locks the sleeve lug 56a in position. As the movement of the sleeve 56 is stopped, the sleeve fixes the end of the spring 54 adjacent to the recess 60 of the cam 48 while allowing the other end to rotate. The spring 54, therefore, increases its coil diameter to release the cam cylindrical portion 48a and the sprocket cylindrical portion 52a from restraint. In this condition, the torque transmission from the sprocket 52 to the cam 48 is interrupted. Although the rotation of the edge 40 continues thereafter due to inertia derived from its substantial mass, the shaft 42 will be brought to a stop as soon as the increasing outside coil diameter abuts against the inner periphery of the sleeve 56.

When the knob 44 is manually rotated in the arrowed direction while the sprocket 52 is in a halt, the pin 78 on the cam 48 abuts against the free end porton of the armature 70. As the knob 44 is further rotated, the armature shoulder 74 slips off the sleeve lug 56a. A preferred angular distance between the point of starting the rotation and the point of resetting the armature 70 is about 10 degrees. Because the sleeve 56 is free to follow the movement of the cam 48 through the spring 54, the coil diameter of the spring 54 does not decrease preventing the torque of the cam 48 from being imparted to the sprocket 52. That is, the cutting edge 40 on the shaft 42 can be manually rotated with a minimum of effort regardless of the load of a motor, which acts on the sprocket 52 through a chain. The operational timing of the edge 40 is usually such that it starts cutting one end of the sheet within the range of about 10–20 degrees after the resetting of the armature 70.

While the present invention has been shown and described in conjunction with a rotary edge for cutting a roll sheet, such is only illustrative and may be replaced by any other application which requires intermittent rotation while, when required, allowing manual rotation in an inoperative condition of a machine, such as registration roller or a sheet feed roller installed in an electrophotographic copier or a facsimile apparatus.

In summary, it will be seen that the present invention provides a one-rotation clutch which, merely by forming a lug in a driven member, allows the driven member to be readily rotated by hand in a same direction as when rotated by power from a drive source.

Various modifications will become possible for those skilled in the art after receiving the teachings of the present disclosure without departing from the scope thereof.

What is claimed is:

1. A one-rotation clutch for selectively establishing and interrupting transmission of a drive force from a drive source to a driven object, comprising:
   a driven shaft integral with the driven object;
   driven means rigidly mounted on said driven shaft and having a locking member;
   drive means located to face said driven means and movably coupled over the driven shaft to be rotatable in a predetermined direction;
   sleeve means rotatably disposed between the driven means and the drive means and having a locked member on an outer periphery thereof;
   spring means disposed in said sleeve means with one end thereof retained by the driven means and the other end thereof retained by the sleeve means, said spring means being wound in such a direction that when the sleeve means is rotated in the predetermined direction with the driven means held in a halt, a coil diameter of the spring is reduced to bind the driven member and the drive member; and
   locking means selectively engageable with the locked member of the sleeve means, whereby when the driven means is rotated in the predetermined direction while the locking means is in engagement with the locked member of the sleeve means, the locking member of the driven means abuts against the locking means to immediately release the locking means and the locked member from each other.

2. A one-rotation clutch as claimed in claim 1, in which the driven means comprises a cylindrical portion rigidly mounted on the driven shaft, a stepped portion and a flange portion.

3. A one-rotation clutch as claimed in claim 2, in which the locking member of the driven means comprises a pin which is studded on the flange portion.

4. A one-rotation clutch as claimed in claim 2, in which the drive means comprises a cylindrical portion disposed to opposite the cylindrical portion of the driven means and common in diameter to the cylindrical portion of the driven member, a stepped portion and a gear portion which is operatively connected to the drive source.

5. A one-rotation clutch as claimed in claim 4, in which opposite end portions of the sleeve means are rotatably coupled over outer peripheries of the stepped portion of the driven means and the stepped portion of the drive means, respectively.

6. A one-rotation clutch as claimed in claim 5, in which the locked member of the sleeve means comprises a lug extending from the outer periphery of the sleeve means.

7. A one-rotation clutch as claimed in claim 1, in which the locking member comprises an armature pivotted to a stationary shaft, a spring for constantly biasing said armature into contact with the outer periphery of the sleeve means to hold the armature in locking engagement with the locked member of the sleeve means, and a solenoid actuator for selectively releasing the locked member from the locking engagement with the armature against the bias of the spring.

8. A one-rotation clutch as claimed in claim 1, in which the driven object comprises an object which is intermittently rotated and rotated by hand.

9. A one-rotation clutch as claimed in claim 8, in which the driven object comprises a registration roller installed in a sheet transport mechanism of one of an electrophotograhic copier and a facsimile apparatus.

10. A one-rotation clutch as claimed in claim 8, in which the driven object comprises a sheet feed roller installed in a sheet transport mechanism of one of an electrophotographic copier and a facsimile apparatus.

11. A one-rotation clutch as claimed in claim 8, in which the driven object comprises a rotatable cutting edge for cutting a roll sheet and included in a sheet cutting mechanism of one of an electrophotographic copier and a facsimile apparatus.

* * * * *